United States Patent [19]

Diersch et al.

[11] Patent Number: 5,383,594
[45] Date of Patent: Jan. 24, 1995

[54] RADIATION-SHIELDING TRANSPORT AND STORAGE CONTAINER

[75] Inventors: Rudolf Diersch, Essen; Klaus Janberg, Ratingen-Lintorf; Dieter Methling, Hattingen; Karl Schröder, Siegen, all of Germany

[73] Assignee: GNS Gesellschaft fur Nuklear-Service mbh, Essen, Germany

[21] Appl. No.: 187,190

[22] Filed: Jan. 25, 1994

Related U.S. Application Data

[62] Division of Ser. No. 948,719, Sep. 22, 1992, Pat. No. 5,346,096.

[30] Foreign Application Priority Data

Oct. 24, 1991 [DE] Germany .......................... 4135066

[51] Int. Cl.⁶ .............................................. B23K 23/00
[52] U.S. Cl. ................................ 228/234.3; 228/184; 228/198; 228/262.4; 164/54
[58] Field of Search ................ 228/119, 198, 234.3, 228/262.4, 262.41, 184; 104/15; 164/54

[56] References Cited

U.S. PATENT DOCUMENTS

| | | | |
|---|---|---|---|
| 3,352,578 | 11/1967 | Burke | 228/234.3 |
| 3,578,233 | 5/1971 | Meister et al. | 228/234.3 |
| 3,948,434 | 4/1976 | Rothchild | 228/234.3 |
| 4,274,007 | 1/1991 | Baatz et al. | 250/506 |
| 4,445,042 | 4/1984 | Baatz et al. | 250/506.1 |
| 4,447,733 | 5/1984 | Baatz et al. | 250/506.1 |
| 4,585,158 | 4/1986 | Wardlaw, III | 228/234.3 |

*Primary Examiner*—Samuel M. Heinrich
*Attorney, Agent, or Firm*—Herbert Dubno; Andrew Wilford

[57] ABSTRACT

A radiation-shielding storage/transport container has a cast-iron vessel having an open end defining an end face, a steel ring engaging the end face and forming at least one annular seat, a weld unitarily bonding the ring to the end face, and a cover secured to the steel ring in the seat thereof. The cast-iron vessel is formed at its open end with an annular seat having a shoulder surface forming the end face. The weld is an aluminothermic weld that extends over the entire surface of the interface between the ring and the vessel. The ring is formed with two such seats and the cover includes an inner plug cover and an outer cover each in a respective one of the seats. The outer cover is of steel and a second peripheral weld connects the outer cover to the respective seat.

3 Claims, 3 Drawing Sheets

RADIATION-SHIELDING TRANSPORT AND STORAGE CONTAINER

This is a divisional of co-pending application Ser. No. 07/948,719 filed on Sep. 22, 1992, now U.S. Pat. No. 5,346,096.

FIELD OF THE INVENTION

The present invention relates to a radiation-shielding storage and transport container. More particularly this invention concerns such a container that is principally made of cast iron and to a method of making same.

BACKGROUND OF THE INVENTION

As described in U.S. Pat. Nos. 4,274,007, 4,445,042, 4,447,733, and 4,528,454 a radiation-shielding storage and transport container for radioactive wastes, for instance spent fuel rods, comprises an upright one-piece cast-iron vessel with an upwardly open mouth formed with seat-forming annular steps. A massive inner cover or plug is secured to the lowest and innermost step, typically by bolting, and at least one lighter-duty outer cover is welded into place in the outer step. The atmosphere in the space between the inner and outer covers can be sampled to see if the container is leaking past the plug.

Accurately forming the cover-receiving seats and securing the covers in place is fairly difficult mainly because cast iron is difficult to turn, bore, and otherwise machine. Since these seats must be made to high tolerances, it is impossible to produce them by casting, so that one must always resort to the difficult procedures entailed in the material-removing machining of cast iron.

OBJECTS OF THE INVENTION

It is therefore an object of the present invention to provide an improved radiation-shielding storage and transport container.

Another object is the provision of such an improved radiation-shielding storage and transport container which overcomes the above-given disadvantages, that is which is substantially simpler and cheaper to manufacture than the prior-art systems.

A further object is to provide an improved method of making the improved container.

SUMMARY OF THE INVENTION

A radiation-shielding storage/transport container has according to the invention a cast-iron vessel having an open end defining an end face, a steel ring engaging the end face and forming at least one annular seat, a weld unitarily bonding the ring to the end face, and a cover secured to the steel ring in the seat thereof. Thus the seats are formed in the readily machinable mild-steel ring, while the balance of the container is made up of cheaper cast iron.

According to the invention the cast-iron vessel is formed at its open end with an annular seat having a shoulder surface forming the end face. The steel ring is set into the open end. Alternately the ring can sit flatly on the end face of the vessel.

The ring and vessel have substantially identical inside and outside diameters and the end face is substantially planar and the weld is an aluminothermic weld that extends over the entire surface of the interface between the ring and the vessel. According to the invention the ring is formed with two such seats and the cover includes an inner plug cover and an outer cover each in a respective one of the seats. The outer cover is of steel and a second peripheral weld connects the outer cover to the respective seat.

The aluminothermic weld is particularly useful in that it ensures a bond throughout the entire interface between the two parts. In it a mixture of two mols elemental aluminum and one mol ferric oxide are combusted exothermically in the following reaction:

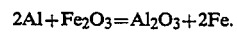

$$2Al + Fe_2O_3 = Al_2O_3 + 2Fe.$$

The elemental iron thus produced is molten and the reaction takes place at about 2400° C. so that the two abutting faces of the vessel and ring will be unitarily bonded to each other. Such a weld will be as strong as the material to both sides of it.

The radiation-shielding storage/transport container can be made according to the invention by holding a cast-iron vessel having an open end defining an end face between an outer mold part and an inner mold part that leave the end face exposed, covering the entire surface of the exposed end face with aluminothermic welding material, positioning on the prepared and exposed end face a steel ring forming at least one annular seat, and unitarily welding together the ring and the vessel over the entire surface of the end face by igniting the welding material.

The steel ring can be positioned on the prepared and exposed end face by pouring a mass of molten steel onto the prepared and exposed end face. In this case the heat of the steel melt will set off the aluminum/oxide mixture.

Alternately the container is made by first holding a steel ring forming at least one annular end face between an outer mold part and an inner mold part that leave the end face exposed upwardly, covering the entire surface of the exposed end face with aluminothermic welding material, pouring onto the prepared and exposed end face a mass of molten cast iron to form an inverted vessel, and unitarily welding together the ring and the vessel over the entire surface of the end face by igniting the welding material. Once again the heat of the molten cast iron sets off the welding mixture.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
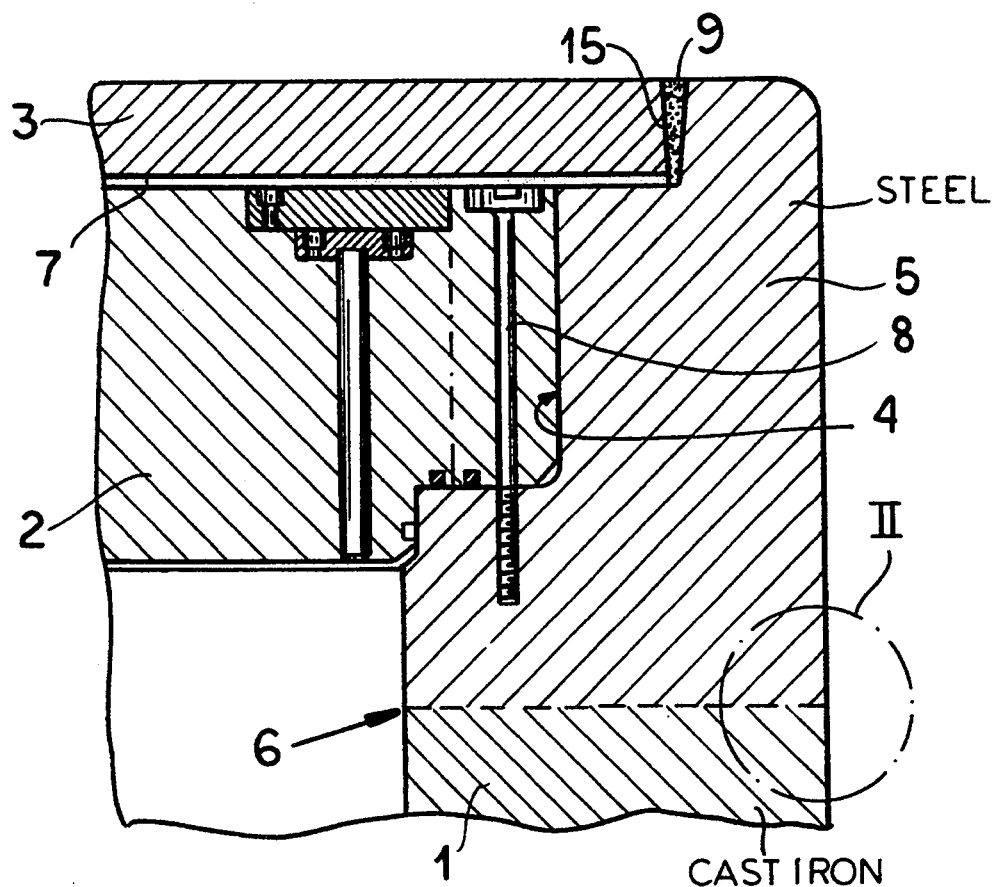
FIG. 1 is a vertical section through a radiation shielding container according to the invention.

As seen in FIG. 1 a container according to the invention comprises a thick-walled cast-iron vessel 1 having a planar end face joined at a weld 6 to a planar end face of a steel ring 5 formed with a lower inner seat 4 and an upper outer seat 15. A massive plug-type inner cover 2 is set in the inner seat 4 and secured in place therein by bolts 8 and a thinner steel cover 3 is fitted to the seat 15 and secured therein by a peripheral weld 9. A space 7 formed between the two covers 2 and 3 can be sampled to detect any leakage past the plug cover 2.

Figure 2:
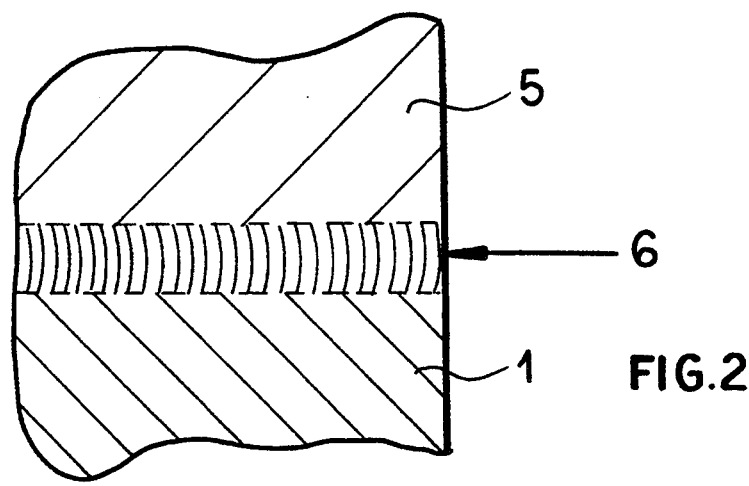
FIG. 2 is a large-scale view of the detail indicated at II in FIG. 1.

FIG. 2 shows how the weld 6 extends over the entire interface between the end faces of the vessel 1 and ring 5. Thus it forms a bond that is as strong as the materials to both sides of it.

Figure 3:
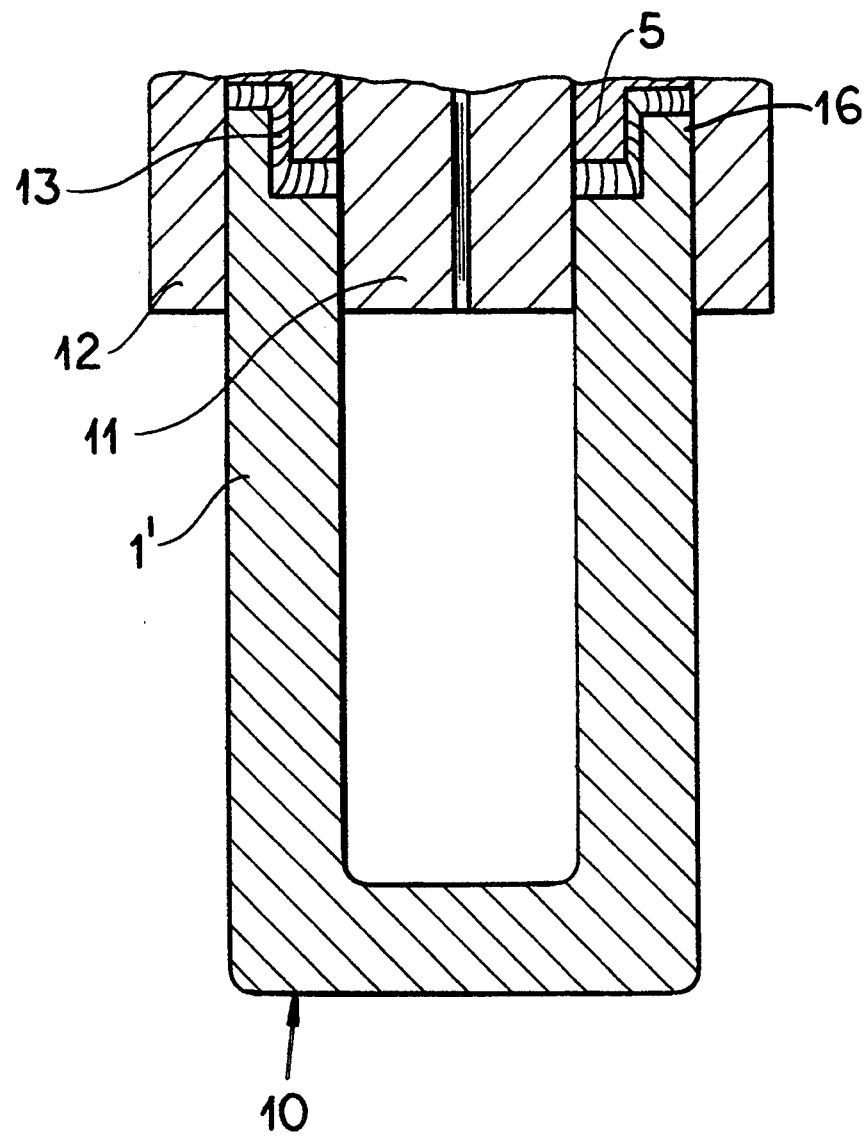
FIG. 3 is a smaller-scale vertical section indicating the method of manufacturing a container according to the invention.

In FIG. 3 a vessel 1' is shown having a closed base 10 and an upper end 16 formed as a step. The end face of this vessel 1' can be machined or ground. This upper end 16 is held between a core or inner mold part 11 and an outer mold part 12 that leave the upper end face of the vessel 1' exposed so it can be covered with a layer 13 of aluminothermic material, namely a mixture of two mols elemental-aluminum powder or shot and one mol feric oxide. Then the ring 5 is joined to the vessel 1' in either of two ways:

- The ring 5 is set atop the vessel 1' and the layer 13 is ignited. This forms a 2400° layer of molten iron and alumina between the two end faces that bonds them together across their entire surface.
- A mass of molten steel is poured between the mold parts 11 and 12, which to this end are formed to create the step seats 4 and 15 for the covers 2 and 3. The heat of the molten steel will set off combustion of the layer 13. In this case the seats 4 and 15 are subsequently finish-machined.

Figure 4:
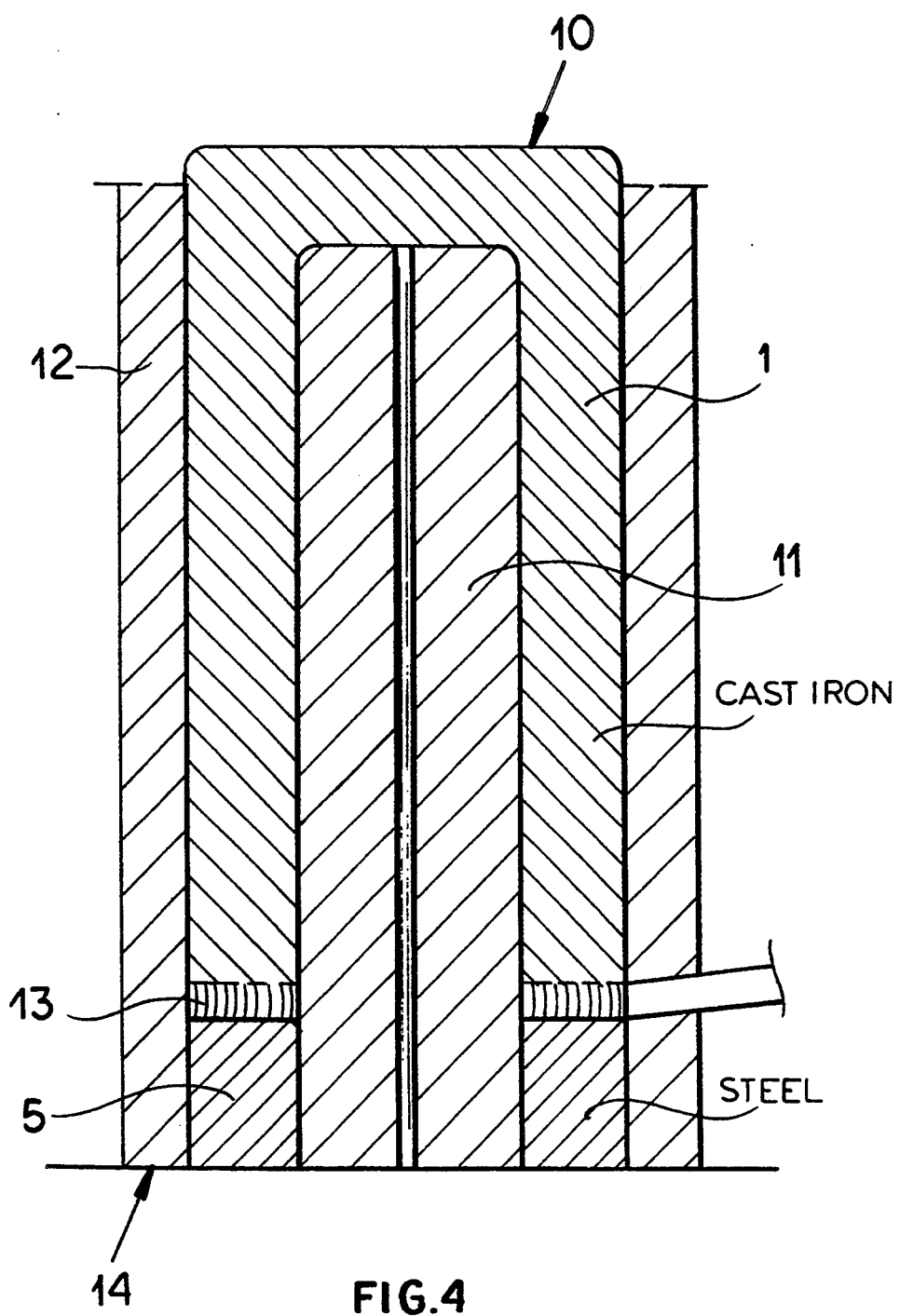
FIG. 4 is a view like FIG. 3 but showing another method in accordance with the invention.

FIG. 4 shows another method according to the invention. Here the finished machined ring 5 is positioned in the bottom of the mold 11, 12 and its end face is covered with the layer 13. Then molten cast iron is poured in to ignite the layer 13 and form the vessel 1.

We claim:

1. A method of making a radiation-shielding storage/transport container, the method comprising the steps of:
   a) holding a cast-iron vessel having an open end defining an end face between an outer mold part and an inner mold part that leave the end face exposed;
   b) covering the entire surface of the exposed end face with aluminothermic welding material;
   c) positioning on the prepared and exposed end face a steel ring forming at least one annular seat; and
   d) unitarily welding together the ring and the vessel over the entire surface of the end face by igniting the welding material.

2. The container-making method defined in claim 1 wherein the steel ring is positioned on the prepared and exposed end face by pouring a mass of molten steel onto the prepared and exposed end face.

3. A method of making a radiation-shielding storage/transport container, the method comprising the steps of:
   a) holding a steel ring forming at least one annular end face between an outer mold part and an inner mold part that leave the end face exposed;
   b) covering the entire surface of the exposed end face with aluminothermic welding material;
   c) pouring onto the prepared and exposed end face a mass of molten cast iron to form an inverted vessel; and
   d) unitarily welding together the ring and the vessel over the entire surface of the end face by igniting the welding material.

* * * * *